US010785304B2

(12) United States Patent
Accetta et al.

(10) Patent No.: US 10,785,304 B2
(45) Date of Patent: Sep. 22, 2020

(54) METHODS AND SYSTEMS FOR MANAGING NETWORK ADDRESSES IN A CLUSTERED STORAGE ENVIRONMENT

(71) Applicant: NETAPP, INC., Sunnyvale, CA (US)

(72) Inventors: Michael Joseph Accetta, McKees Roacks, PA (US); Jeffrey Eric Semke, Allison Park, PA (US); Jeffrey David Prem, Pittsburgh, PA (US)

(73) Assignee: NETAPP, INC., Sunnyvale, CA (US)

( * ) Notice: Subject to any disclaimer, the term of this patent is extended or adjusted under 35 U.S.C. 154(b) by 71 days.

(21) Appl. No.: 16/178,436

(22) Filed: Nov. 1, 2018

(65) Prior Publication Data

US 2019/0075162 A1    Mar. 7, 2019

Related U.S. Application Data

(63) Continuation of application No. 14/505,196, filed on Oct. 2, 2014, now abandoned.

(51) Int. Cl.
*H04L 29/08* (2006.01)
*H04L 29/12* (2006.01)

(52) U.S. Cl.
CPC ...... *H04L 67/1097* (2013.01); *H04L 61/2015* (2013.01); *H04L 61/6068* (2013.01)

(58) Field of Classification Search
None
See application file for complete search history.

(56) References Cited

U.S. PATENT DOCUMENTS

| | | | |
|---|---|---|---|
| 7,343,350 B1 * | 3/2008 | Donner | G06Q 10/02 705/64 |
| 7,707,263 B1 | 4/2010 | Cramer et al. | |
| 8,549,517 B2 | 10/2013 | Koma | |
| 9,531,668 B2 | 12/2016 | Ryu et al. | |
| 2004/0006587 A1 | 1/2004 | McConnell et al. | |
| 2004/0049573 A1 | 3/2004 | Olmstead et al. | |
| 2006/0173781 A1 * | 8/2006 | Donner | G06Q 30/0268 705/50 |
| 2009/0177720 A1 | 7/2009 | Shitomi et al. | |
| 2009/0254649 A1 | 10/2009 | Coffey et al. | |
| 2011/0113192 A1 | 5/2011 | Mimatsu et al. | |
| 2012/0072564 A1 | 3/2012 | Johnsen | |
| 2012/0185563 A1 * | 7/2012 | Sugiyama | H04L 12/4641 709/217 |
| 2013/0124451 A1 | 5/2013 | Das et al. | |
| 2014/0123135 A1 * | 5/2014 | Huang | G06F 9/45558 718/1 |

(Continued)

OTHER PUBLICATIONS

Egevang et al.; "The IP Network Address Translator (NAT)"; Network Working Group; May 1994; 12 pages.

*Primary Examiner* — Davoud A Zand (74) *Attorney, Agent, or Firm* — Klein, O'Neill & Singh, LLP (57) ABSTRACT

Methods and systems are provided for a clustered storage system. The method assigns a network access address to a virtual network interface card (VNIC) at a first cluster node of a clustered storage system, where a physical network interface card assigned to the network access address is managed by a second cluster node of the clustered storage system; and use the VNIC by a virtual storage server at the first cluster node to communicate on behalf of the second cluster node.

20 Claims, 9 Drawing Sheets

(56) References Cited

U.S. PATENT DOCUMENTS

| | | |
|---|---|---|
| 2014/0185611 A1 | 7/2014 | Lie et al. |
| 2014/0185627 A1 | 7/2014 | Ditya |
| 2015/0234907 A1* | 8/2015 | Shinohara ............... G06F 16/27 |
| | | 702/123 |
| 2016/0057223 A1* | 2/2016 | Puharre ................. H04W 84/18 |
| | | 709/219 |

* cited by examiner

| IP Address | VServer | Node | NIC |
|---|---|---|---|
| 126.1 | VS1 | 1 | 1 (124.1) |
| 126.2 | VS2 | 2 | 2A (124.2) |
| 126.3 | VS2 | 3 | 3 (124.3) |
| 126.4 | VS3 | 4 | 4 (124.4) |
| 126.5 | VS2 | 3 | 3 (124.3) |
| 126.6 | VS3 | 2 | 2B (124.2B) |
| Destination | Subnet Mask | Gateway | Vserver |
| x.x.x.x | 255.255.255.0 | 10.98.10.1 | VS1 |
|  |  |  |  |
|  |  |  |  |
|  |  |  |  |
| IP Address | Vserver | Node | Port #/Protocol |
| 126.2 | VS2 | Node 1 | P1/TCP |
|  |  |  |  |
|  |  |  |  |
|  |  |  |  |

127A → rows with IP Address/VServer/Node/NIC
127B → rows with Destination/Subnet Mask/Gateway/Vserver
127C → rows with IP Address/Vserver/Node/Port #/Protocol

METHODS AND SYSTEMS FOR MANAGING NETWORK ADDRESSES IN A CLUSTERED STORAGE ENVIRONMENT

CROSS-REFERENCE TO RELATED APPLICATION

This patent application claims priority of and is a continuation of U.S. patent application Ser. No. 14/505,196, filed on Oct. 2, 2014, the disclosure of which is incorporated herein by reference in its entirety.

TECHNICAL FIELD

The present disclosure relates to communication in networked storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems may include a plurality of nodes operating within a cluster for processing client requests. The nodes may use virtual network interfaces for client communication. Continuous efforts are being made for efficiently managing network addresses that are used by the cluster nodes.

SUMMARY

In one aspect, a machine implemented method is provided. The method includes assigning a network access address to a virtual network interface card (VNIC) at a first cluster node of a clustered storage system, where a physical network interface card assigned to the network access address is managed by a second cluster node of the clustered storage system; and using the VNIC by a virtual storage server at the first cluster node to communicate on behalf of the second cluster node.

In another aspect, a non-transitory, machine readable storage medium having stored thereon instructions for performing a method is provided. The machine executable code which when executed by at least one machine, causes the machine to: assign a network access address to a virtual network interface card (VNIC) at a first cluster node of a clustered storage system, where a physical network interface card assigned to the network access address is managed by a second cluster node of the clustered storage system; and use the VNIC by a virtual storage server at the first cluster node to communicate on behalf of the second cluster node.

In yet another aspect, a system having a memory with machine readable medium comprising machine executable code with stored instructions is provided. A processor module coupled to the memory is configured to execute the machine executable code to: assign a network access address to a virtual network interface card (VNIC) at a first cluster node of a clustered storage system, where a physical network interface card assigned to the network access address is managed by a second cluster node of the clustered storage system; and use the VNIC by a virtual storage server at the first cluster node to communicate on behalf of the second cluster node.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods and systems are provided for a clustered storage system. The method assigns a network access address to a virtual network interface card (VNIC) at a first cluster node of a clustered storage system, where a physical network interface card assigned to the network access address is managed by a second cluster node of the clustered storage system; and use the VNIC by a virtual storage server at the first cluster node to communicate on behalf of the second cluster node.

Figure 1A:
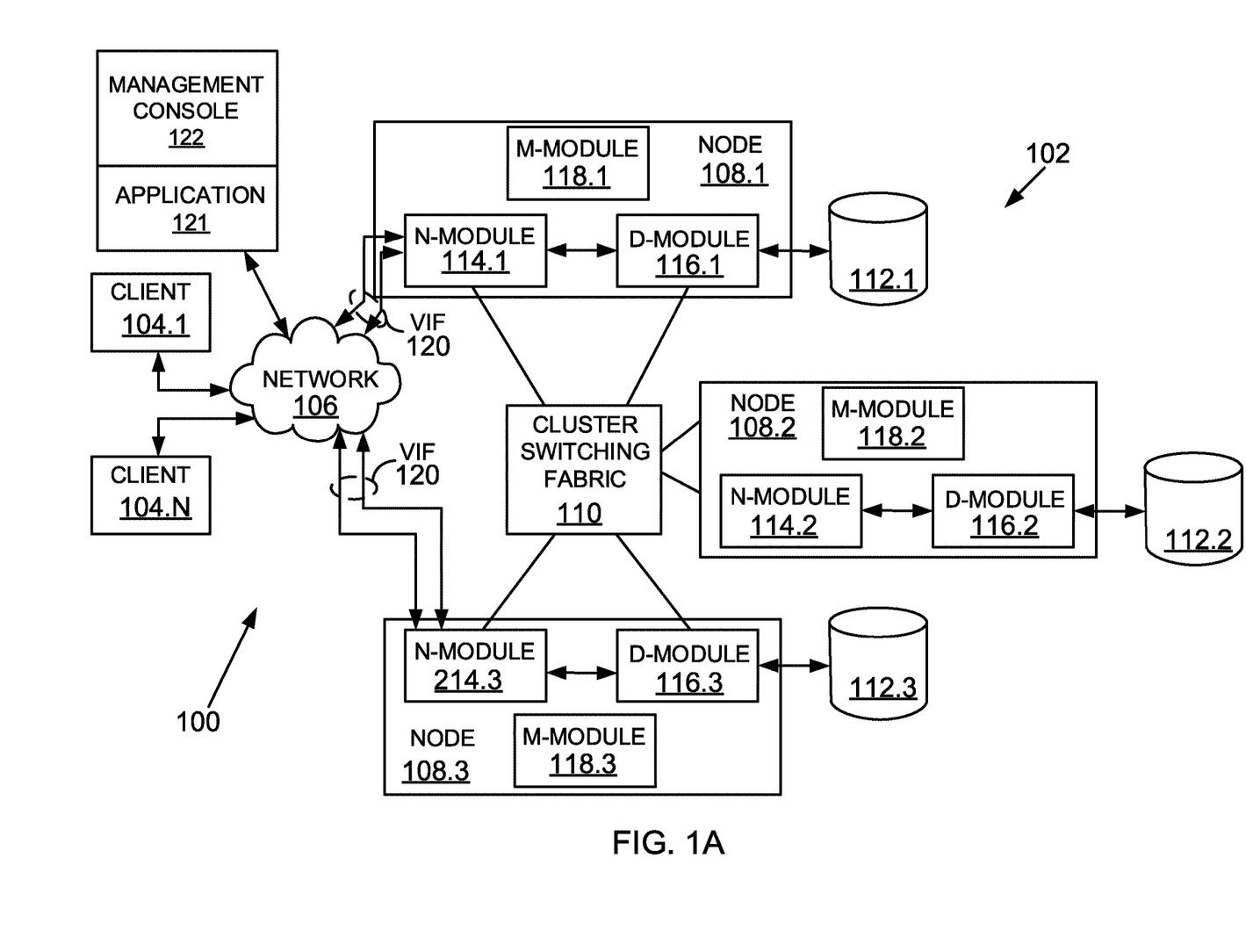
FIGS. 1A-1B show examples of an operating environment for the various aspects disclosed herein.

Clustered System: FIG. 1A shows a cluster based storage environment 100 having a plurality of nodes for managing storage devices, according to one aspect. Storage environment 100 may include a plurality of client systems 104.1-104.N, a clustered storage system 102 and at least a network 106 communicably connecting the client systems 104.1-104.N and the clustered storage system 102.

The clustered storage system 102 may include a plurality of nodes 108.1-108.3, a cluster switching fabric 110, and a plurality of mass storage devices 112.1-112.3 (may be also be referred to as 112). The mass storage devices 112 may include writable storage device media such as magnetic disks, video tape, optical, DVD, magnetic tape, non-volatile memory devices for example, self-encrypting drives, flash memory devices and any other similar media adapted to store information. The storage devices 112 may be organized as one or more groups of Redundant Array of Independent (or Inexpensive) Disks (RAID). The aspects disclosed are not limited to any particular storage device or storage device configuration.

The storage system 102 provides a set of storage volumes for storing information at storage devices 112. A storage operating system executed by the nodes of storage system 102 present or export data stored at storage devices 112 as a volume, or one or more qtree sub-volume units. Each volume may be configured to store data files (or data containers or data objects), scripts, word processing documents, executable programs, and any other type of structured or unstructured data. From the perspective of client systems, each volume can appear to be a single storage drive. However, each volume can represent the storage space in at one storage device, an aggregate of some or all of the storage space in multiple storage devices, a RAID group, or any other suitable set of storage space.

The storage system 102 may be used to store and manage information at storage devices 112 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

Each of the plurality of nodes 108.1-108.3 is configured to include an N-module, a D-module, and an M-Module, each of which can be implemented as a processor executable module. For example, node 108.1 includes N-module 114.1, D-module 116.1, and M-Module 118.1, node 108.2 includes N-module 114.2, D-module 116.2, and M-Module 118.2, and node 108.3 includes N-module 114.3, D-module 116.3, and M-Module 118.3.

The N-modules 114.1-114.3 include functionality that enable the respective nodes 108.1-108.3 to connect to one or more of the client systems 104.1-104.N over network 106 and with other nodes via switching fabric 110. The D-modules 116.1-116.3 connect to one or more of the storage devices 112.1-112.3. The M-Modules 118.1-118.3 provide management functions for the clustered storage system 102.

The M-modules 118.1-118.3 may be used to store an address data structure (127, FIG. 1B) that is described below in detail.

A switched virtualization layer including a plurality of virtual interfaces (VIFs) 120 is provided to interface between the respective N-modules 114.1-114.3 and the client systems 104.1-104.N, allowing storage 112.1-112.3 associated with the nodes 108.1-108.3 to be presented to the client systems 104.1-104.N as a single shared storage pool.

In one aspect, the clustered storage system 102 can be organized into any suitable number of virtual servers (may also be referred to as "Vservers" or virtual storage machines). A Vserver is a virtual representation of a physical storage controller/system and is presented to a client system for storing information at storage devices 112. Each Vserver represents a single storage system namespace with independent network access.

Each Vserver has a user domain and a security domain that are separate from the user and security domains of other Vservers. Moreover, each Vserver is associated with one or more VIFs 120 and can span one or more physical nodes, each of which can hold one or more VIFs 120 and storage associated with one or more Vservers. Client systems can access the data on a Vserver from any node of the clustered system, but only through the VIFs associated with that Vserver.

Each of the nodes 108.1-108.3 is defined as a computing system to provide application services to one or more of the client systems 104.1-104.N. The nodes 108.1-108.3 are interconnected by the switching fabric 110, which, for example, may be embodied as a switch or any other type of connecting device.

Although FIG. 1A depicts an equal number (i.e., 3) of the N-modules 114.1-114.3, the D-modules 116.1-116.3, and the M-Modules 118.1-118.3, any other suitable number of N-modules, D-modules, and M-Modules may be provided. There may also be different numbers of N-modules, D-modules, and/or M-Modules within the clustered storage system 102. For example, in alternative aspects, the clustered storage system 102 may include a plurality of N-modules and a plurality of D-modules interconnected in a configuration that does not reflect a one-to-one correspondence between the N-modules and D-modules.

Each client system may request the services of one of the respective nodes 108.1, 108.2, 108.3, and that node may return the results of the services requested by the client system by exchanging packets over the computer network 106, which may be wire-based, optical fiber, wireless, or any other suitable combination thereof. The client systems may issue packets according to file-based access protocols, such as the NFS or CIFS protocol, when accessing information in the form of files and directories.

System 100 also includes a management console 122 executing a management application 121 out of a memory. Management console 122 may be used to configure and manage various elements of system 100.

In one aspect, the nodes of cluster 102 operate together using a given Internet Protocol (IP) address space. A Vserver is typically presented with an IP address and a port identifier (referred to as a logical interface or "LIF"). The port identifier identifies a port of a network interface that is used for network communication i.e. for sending and receiving information from clients of other devices outside the cluster 102.

Most networks today use the TCP/IP protocol for network communication. In the TCP/IP protocol, an IP address is a network access address that is used to uniquely identify a computing device. As an example, there are two standards for IP addresses: IP Version 4 (IPv4) and IP Version 6 (IPv6). IPv4 uses 32 binary bits to create a single unique address on the network. An IPv4 address is expressed by four numbers speareted by dots. Each number is the decimal (base-10) representation for an eight-digit binary (base-2) number, also called an octet, for example: 216.27.61.137.

IPv6 uses 128 binary bits to create a single unique address on the network. An IPv6 address is expressed by eight groups of hexadecimal (base-16) numbers separated by colons.

An IP address can be either dynamic or static. A static address is one that a user can configure. Dynamic addresses are assigned using a Dynamic Host Configuration Protocol (DHCP), a service running on a network. DHCP typically runs on network hardware such as routers or dedicated DHCP servers.

A Vserver at a first cluster node may have to establish a network connection or communication on behalf of a second cluster node. The communication may be to send or receive a management command from management console 122. The Vserver may not have any LIFs at all or the first cluster node may not own the LIF for making the connection. The various aspects described herein enable the first cluster node to make a network connection on behalf of the second cluster node as described below in detail.

Figure 1B:
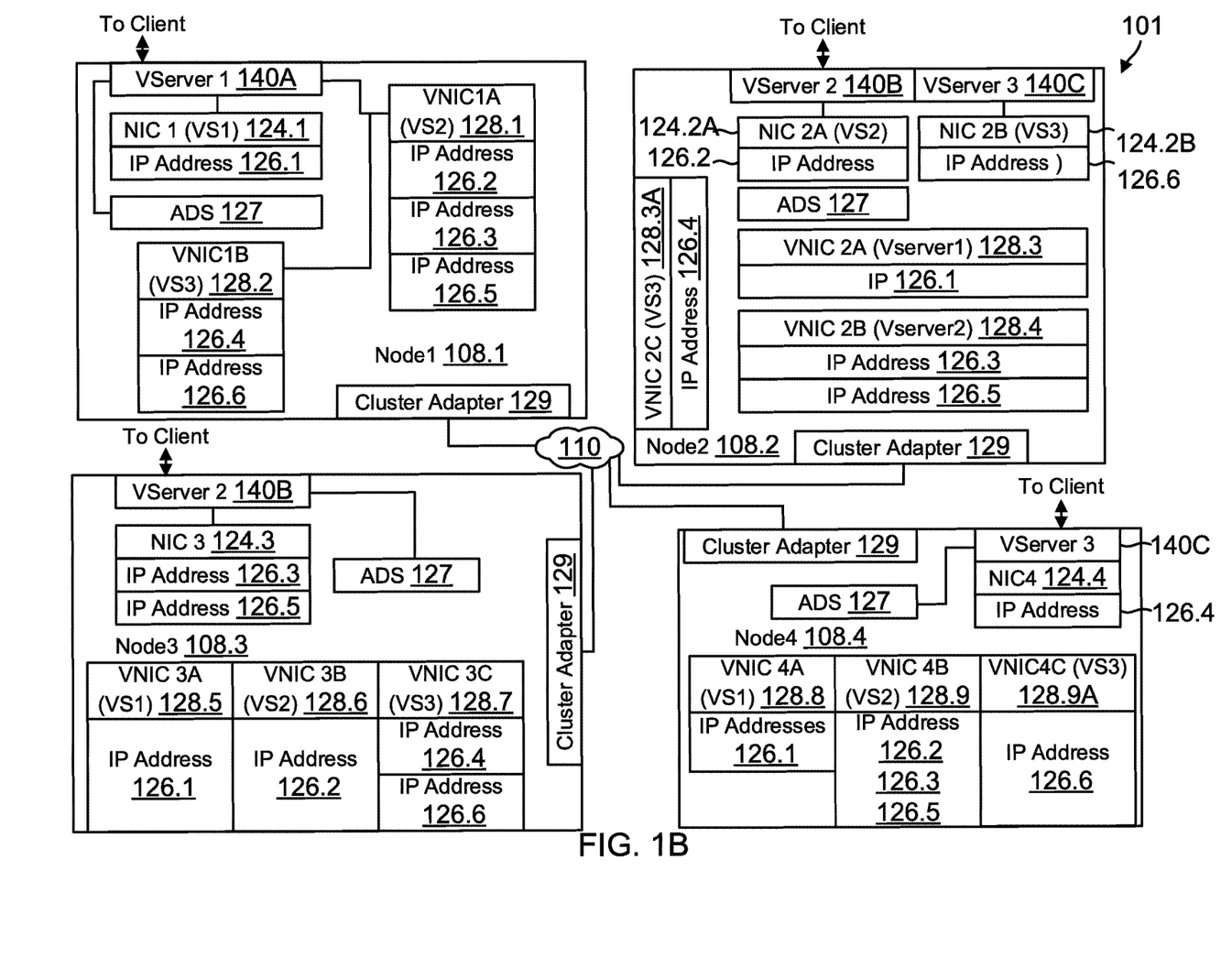

FIG. 1B shows an example of a clustered system 101, similar to cluster 102, except with four nodes 108.1-108.4 for presenting one or more Vservers 140A-140C to client systems 104.1-104.N. As described below in detail, a node in cluster 101 is able to make a network connection using a LIF that is owned and managed by another node. Nodes 108.1-108.4 may communicate with each other using cluster adapters 129 via the cluster network 110.

Each Vserver is assigned one or more unique LIF to communicate with any device outside the cluster. Each LIF includes an external IP address by which clients connect to a node. The IP address may be static or dynamic and is assigned when the cluster is being configured.

Each node stores an address data structure (ADS) 127 that enables a Vserver to initiate communication with a device outside the cluster using an IP address that is assigned to and managed by (i.e. owned by) another node. ADS 127 is used to store a listing of all IP addresses within the cluster, the Vservers that are associated with the IP addresses and the nodes that own specific IP addresses. ADS 127 is described below in detail with respect to FIG. 1C.

As an example, Node 1 108.1 includes a physical network interface card (NIC) 1 124.1. NIC 124.1 may be used by the node to communicate with clients. IP address 126.1 is associated with NIC 1 124.1 and Vserver 1 (Vs1) 140A may use IP address 126.1 to communicate with clients 104. It is noteworthy that Node 1 108.1 may have more than one physical NIC and/or LIFs.

Node 1 108.1 also uses a plurality of virtual NICs (VNICs) to communicate with devices outside the clustered storage system on behalf of other nodes. A VNIC is a virtual representation of a physical NIC. It is noteworthy that the Vserver node can use either the physical NIC or a VNIC for communication.

As an example, Node 1 108.1 includes or uses VNIC 1A 128.1 for communication on behalf of Vserver 2 140B and VNIC 1B 128.2 for communication on behalf of Vserver 3 140C. VNIC 1A 128.1 is associated with IP addresses 126.2, 126.3 and 126.5, while VNIC 1B 128.2 is associated with IP addresses 126.4 and 126.6. As described below, IP addresses 126.2, 126.3, 126.4, 126.5 and 126.6 are owned by other nodes and not by Node 1 108.1

As an example, Node 2 108.2 includes NICs 2A 124.2A and 124.2B associated with IP addresses 126.2 and 126.6, respectively. Vserver 2 140B may use NIC 2A 124.2A and Vserver 3 140C may use NIC 2B 124.2B for communication outside the cluster via Node 2 108.2. To make a connection on behalf of Vserver 1 140A, Node 2 uses VNIC 2A 128.3 with IP addresses 126.1 that is owned by Node 1 108.1. Node 2 108.2 may also use VNIC 2B for establishing a connection for Vserver 2 140B on behalf of Node 3 108.3. In such a case, IP addresses 126.3 and 126.5 that are owned by Node 3 108.3 are used to make the connection.

Similarly, Node 2 108.2 may use VNIC 2C 128.3A with IP address 126.4 to make a connection on behalf of Node 4 108.4 for Vserver 3 140C. IP address 126.4 is owned by Node 4 108.4.

Node 3 108.3 includes NIC 3 124.3 with IP addresses 126.3 and 126.5. Vserver 2 140B may use these IP addresses to communicate with clients and other entities/devices. Node 3 108.3 also uses VNIC 3A 128.5 with IP address 126.1 owned by Node 1 108.1 to communicate on behalf of Node 1 108.1/Vserver 1 140A. Node 3 108.3 may also use VNIC 3B 128.6 with IP address 126.2 to communicate on behalf of Node 2 108.2/Vserver 2 140B. Node 3 108.3 further uses VNIC 3C with IP addresses 126.4 and 126.6 to communicate on behalf of Vserver 3 140C when IP addresses 126.4/126.6 are owned by Node 2 108.2 and Node 4 108.4.

Node 4 108.4 includes NIC 4 124.4 with IP address 126.4. Vserver 3 140C may use IP address 126.4 to communicate with clients. Node 4 108.4 also includes a plurality of VNICs to communicate on behalf of other nodes using IP addresses that are owned by the other nodes. For example, VNIC 4A 128.8 is used to communicate on behalf of Node 1 108.1 for Vserver 1 140A using the IP address 126.1 owned by Node 1 108.1. VNIC 4B 128.9 may be used to communicate on behalf of Node 2 or Node 3 for Vserver 2 140B using the IP address 126.2, owned by Node 2, 108.2 and IP addresses 126.3 and 126.5 that are owned by Node 3 108.3. VNIC 4C 128.9A may be used to communicate on behalf of Node 2 108.2 for Vserver 3 140C using the IP address 126.6 that is owned by Node 2 108.2

It is noteworthy that a node may use a local LIF or a remote LIF for communicating on behalf of Vservers. For example, Node 2 108.2 may use the local IP address 126.2 for communicating on behalf of Vserver 2 or the non-local IP addresses 126.3 and 126.5 that are owned by Node 3 108.3.

Figure 1C:
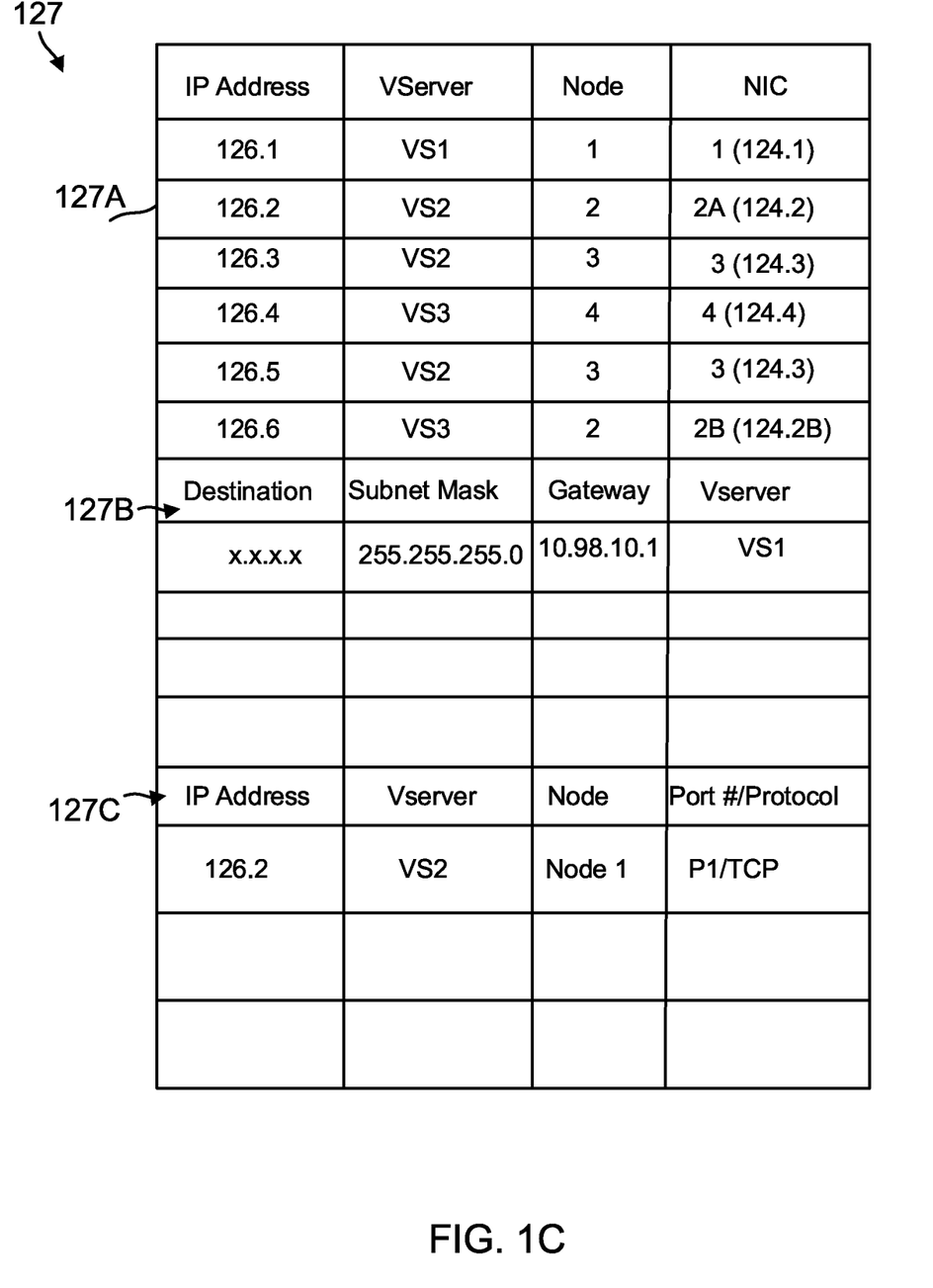
FIG. 1C shows an example of an address data structure, according to one aspect of the present disclosure.

ADS 127: FIG. 1C illustrates an example of ADS 127 with a plurality of segments 127A, 127B and 127C. ADS 127 enables the configuration that allows one node to communicate on behalf of another node, according to one aspect.

As an example, segment 127A stores a listing of IP addresses, Vservers, Nodes and NICs, while segment 127B is a routing data structure for each IP address and the associated Vserver. Segment 127C is maintained to track port reservations made by one node to communicate on behalf of another node. For example, if Node 1 108.1 intends to communicate on behalf of a Vserver having a LIF that is owned by another node, then segment 127C tracks the IP address, a node identifier identifying the node, a port identifier (Port #) that is used by the node and a protocol used for the communication, for example, TCP. It is noteworthy that for clarity, separate segments 127A-127C have been shown in FIG. 1C, the various aspects disclosed herein are not limited to separate segments and instead, the data structure 127 may be consolidated into one single structure, or any other number of segments.

Segment 127A includes various IP addresses, for example, 126.1-126.6. Each IP address is associated with a Vserver, for example, 126.1 is assigned to Vs1 (Vserver 1), IP addresses 126.2, 126.3, and 126.5 are assigned to Vs2 (Vserver 2) and IP addresses 126.4 and 126.6 are assigned to Vs3 (Vserver 3).

In one aspect, segment 127A is used to generate the various VNICs used by the different nodes. Examples of various VNICs are described above with respect to FIG. 1B and can be used by any Vserver node to communicate on behalf of another Vserver node, even when the physical IP address is not present at the particular node of the Vserver.

Segment 127B is a routing data structure with a destination (shown as x.x.x.x), a subnet mask (for example, 255.255.255.0) and a gateway (for example, 10.98.10.1) associated with a Vserver (for example, VS1). A Subnet is a logical, visible portion of an IP network. All network devices of a subnet are addressed with a common, identical, most-significant bit-group in their IP address. This results in the logical division of an IP address into two fields, a network or routing prefix and a host identifier that identifies a network interface. A gateway address is also assigned to the subnet and is used by a computing device within the subnet for routing information. A subnet mask is associated with each IP address of a NIC/VNIC. The mask is used to select the NIC/VNIC which can reach the gateway once its IP address has been established.

Segment 127C identifies Node 1 as having a port reservation for Port P1 for communicating on behalf of Node 2 108.2 for Vserver 2 using IP address 126.2. The port reservation allows Node 1 to communicate without any conflict with other uses of IP address 126.2. The process for making the port reservation is now described below with respect to FIG. 2A.

Figure 2A:
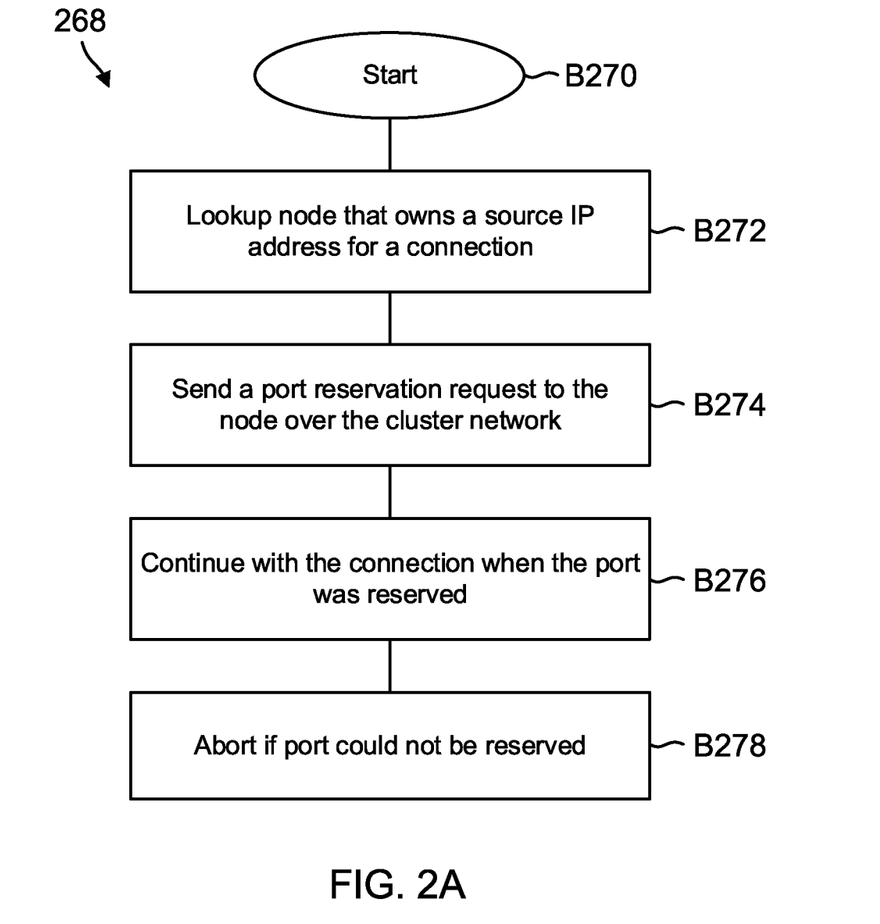
FIGS. 2A-2F show various process flow diagrams, according the various aspects of the present disclosure.

Process Flows: FIG. 2A shows a process 268 that occurs prior to creating a connection using a VNIC, according to one aspect. As an example, the connection may be originated by Vserver 2 at Node 1 108.1. The process begins in block B270. In block B272, VNIC 1A 128.1 looks up in ADS 127A the node that owns an IP address for a connection, for example, 126.2 owned by Node 2 108.2. In block B274, Node 1 108.1 sends a port reservation request to Node 2 108.2 over the cluster network 110. The port reservation request is made so that a port can be reserved for node 1 108.1 to originate packets with this as the source port and IP address 126.2 as the source address, so that node 2 108.2 can transmit packets via its NIC 2A which owns the IP address 126.2.

In block B276, if the port reservation request is successful then in block B276, a connection is established by Node 1 108.1 with an external client using a source address that is owned by Node 2 (for example, 126.2) and the newly reserved source port enables Node 2 to transmit packets for Node 1. If the request is unsuccessful, then the connection attempt is aborted in block B278.

Figure 2B:
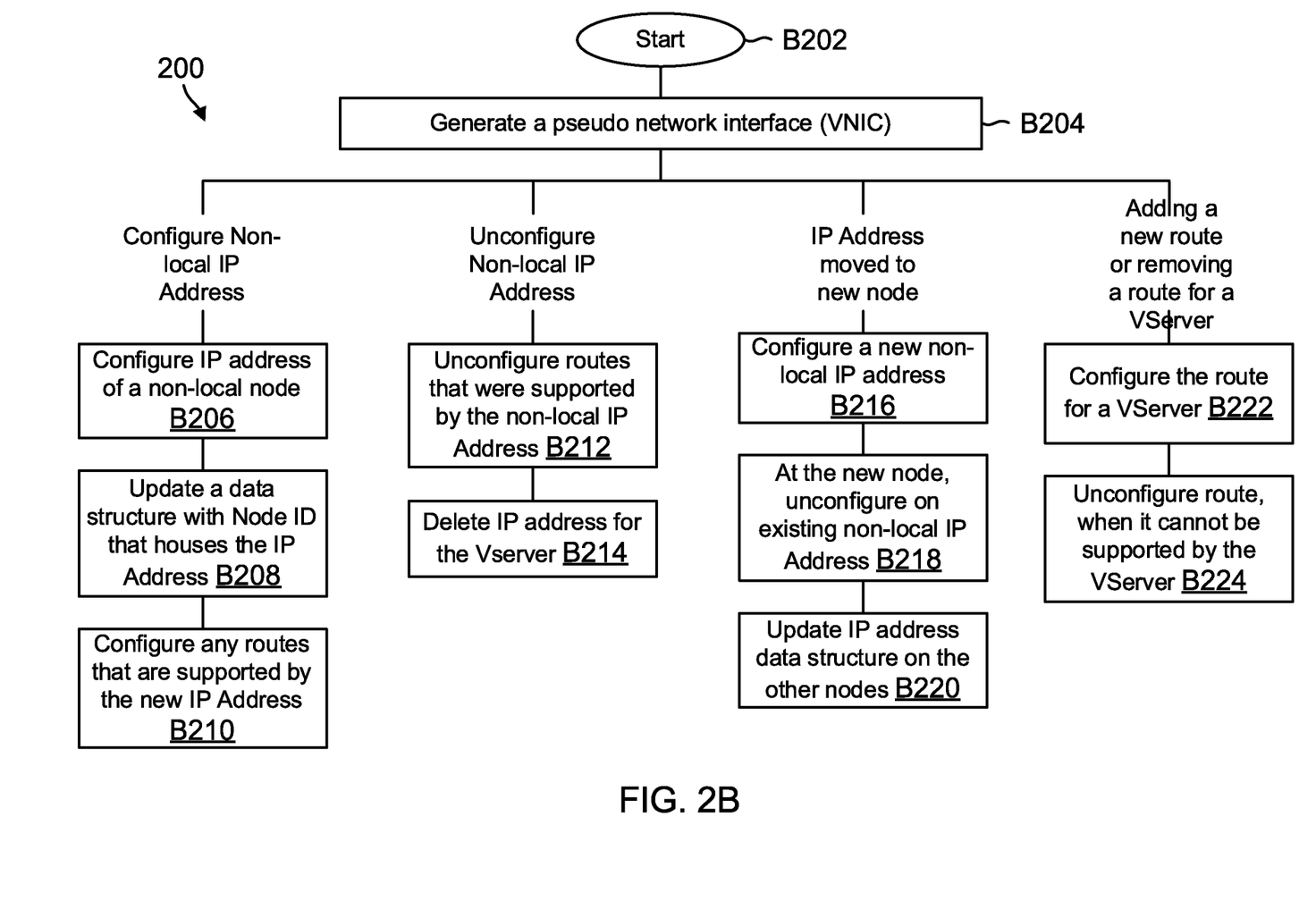

FIG. 2B shows a process 200 for configuring IP addresses, according to one aspect of the present disclosure. In one aspect, ADS 127 may be used to configure the IP addresses and generate the associated VNICs. The various process blocks of FIG. 2B may be executed by the management application 121.

Process 200 begins in block B202, when management console 122 and nodes 108.1-108.4 are initialized and operational. In block B204, a VNIC is generated for a node. The VNIC can be used by a Vserver to communicate with devices outside the cluster. The VNIC is generated when a LIF is configured for a NIC using the management application 121. In one aspect, a graphical user interface (GUI) and/or a command line interface (CLI) may be presented by the management console 122 to directly configure the NIC, which results in creating a VNIC. It is noteworthy that a VNIC is created when a first LIF is created for a Vserver. Subsequent LIFs are simply added to an existing VNIC. It is also noteworthy that a VNIC is created for the LIF on all cluster nodes except for the node with the physical NIC on which the IP address is configured.

The VNIC can be configured in various ways, for example, an IP address may be configured for the VNIC, a non-local IP address may be un-configured, an IP address may be moved to a new node or a new route may be configured or removed for a Vserver. It is noteworthy that VNIC configuration process occurs in parallel as a response to NIC configuration. The local/non-local distinction is with respect to the node that owns a NIC on which an IP address is configured. For a VNIC, the IP address is non-local.

The various VNIC configurations are now described in detail with respect to various components/modules of FIGS. 1B/1C. It is noteworthy that the various process blocks described below may occur in parallel or at different times, depending on whether a first LIF is being created or a LIF is being moved or deleted.

In block B206, an IP address is configured for a non-local node. For example, IP addresses 126.2, 126.3 and 126.5 are configured for VNIC 1A 128.1 at Node 1 108.1 as a result of being configured for their respective NICs on nodes 108.2 and 108.3. The VNIC 1A 128.1 can be used by Node 1 108.1 to communicate on behalf of Node 2 108.2 and Node 3 108.3 and Vserver 2 140B. As described above, IP addresses 126.2, 126.3 and 126.5 are not owned by Node 1 108.1 and hence are considered non-local to Node 1. Similarly, the IP addresses for the other VNICs, as shown in FIG. 1B may be configured. It is noteworthy that an IP address for a NIC on one node is configured on a VNIC of every other node of a cluster.

In block B208, segment 127A of ADS 127 is updated to reflect the node location of the new LIF for the VNIC. In block B210, any routes from segment 127B of the Vserver that are newly supported by the new non-local IP address are configured against the VNIC.

In block B212, a non-local IP address is un-configured for a Vserver, according to one aspect. Any routes that are only supported for the IP address are disabled. Thereafter, the non-local IP address for the VNIC is deleted in block B214. It is noteworthy if the deleted LIF is the last LIF for the VNIC, then the VNIC is also deleted.

In block B216, an existing IP address for a Vserver is moved to a new node. For example, an IP address 126.1 owned and managed by Node 108.1 may be moved to Node 2 108.2. The new IP address is then configured at the new node. At the node which owned the IP address prior to the move, the IP address is configured on a VNIC. Process block B216 includes process blocks B206, B208 and B210, described above.

At the new node, the moved IP address is un-configured from a VNIC in block B218, which includes blocks B212 and B214. At the other nodes, in block B220, ADS 127 is updated to indicate that the new node manages the IP address.

In block B222, a new route for a Vserver is configured and added to ADS 127B. If its gateway is reachable by one or more of the addresses of the VNIC, the route is configured in a network stack (not shown) against this VNIC.

If a route is unconfigured from the Vserver and removed from ADS 127B, then in block B224, the route is unconfigured from the network stack for the VNIC, if currently configured.

Figure 2C:
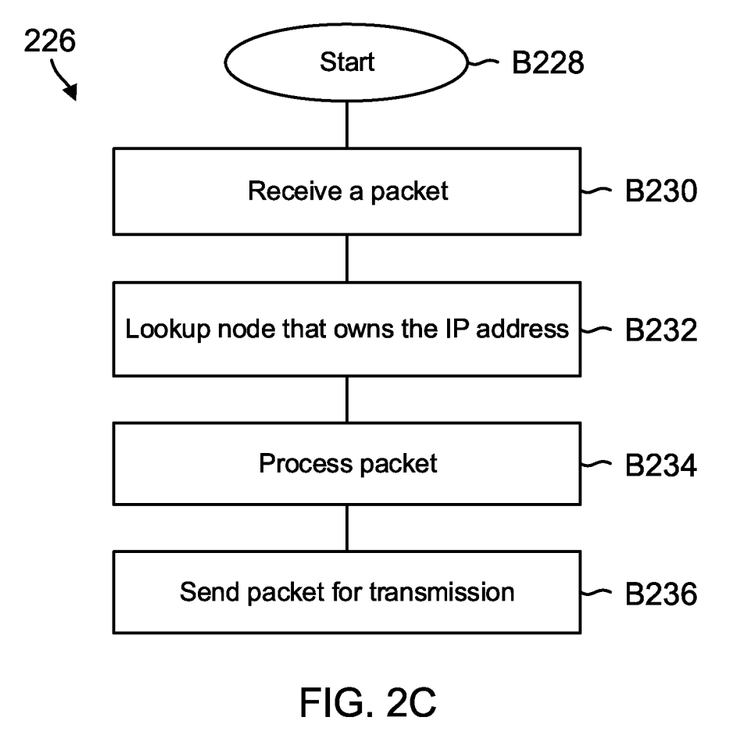

FIG. 2C shows a process 226 for transmitting a packet by a node, for example, by Vserver 2 140B of Node 1 108.1 on behalf of Node 2 108.2 using IP address 126.2 that is owned by Node 2. A packet for Vserver 2 140B is received at VNIC 1A 128.1. In block B232, segment 127A is used to determine the node that owns the source IP address for the packet, for example, Node 2 108.2, if the IP address was 126.2. In block B234, the packet is encapsulated in a message and then in block B236, the message is sent to Node 2 108.2 for transmitting the packet.

Figure 2D:
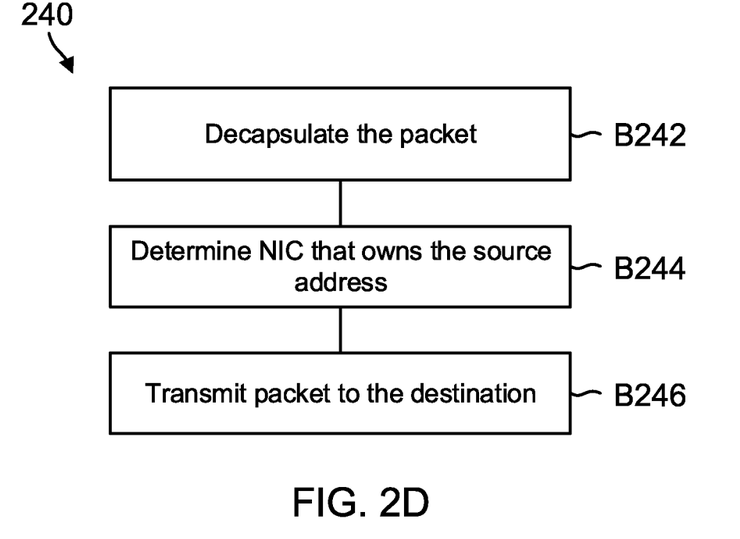

FIG. 2D shows a process 240, where the message from process 226 is received at Node 2 108.2. The packet is de-capsulated from the message in block B242. During this process, the packet is parsed and a packet header is validated.

In block B244, Node 2 108.1 uses data structure 127 to determines the NIC that owns the source IP address. In this example, NIC 2A 124.2A owns the IP address 126.2. Thereafter, in block B246, the packet is transmitted to its destination by Vserver 2 140B of Node 2 108.2.

Figure 2E:
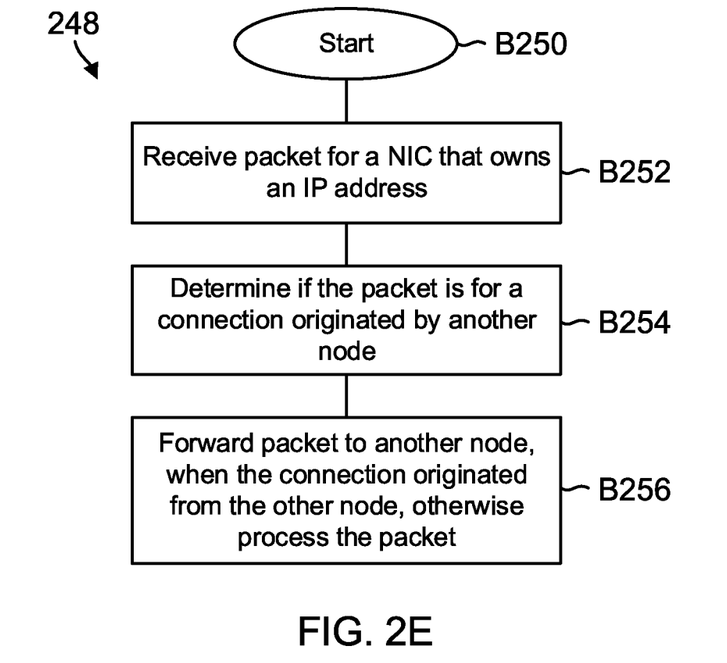

FIG. 2E shows a process 248 for receiving a packet from outside the cluster, for example, a client, management console or any other device, according to one aspect. Process 248 starts in block B250, when a client system is initialized and operational.

In block B252, a packet is received at a node, for example, Node 2 108.2. As an example, the packet may be received by Vserver 2 140B. In block B254, Vserver 2 140B determines if the connection for the packet originated from another node. This is determined by using segment 127C of ADS 127 to look up a port reservation for an IP address, which then provides the originating node. In block B256, the packet is forwarded to the other node if the other node originated the connection by encapsulating the packet in a message, otherwise, the packet is processed by Node 2 108.2, if it originated the connection.

Figure 2F:
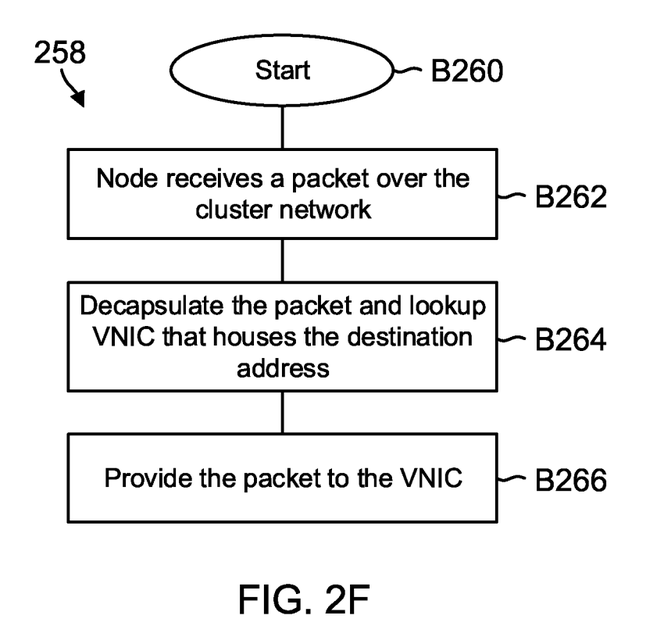

FIG. 2F shows a process 258, when a message s received by the other node that originated the connection (for example, Vserver 2 140B of Node 1 108.1). The process begins in block B260, when Node 2 108.2 forwards the packet to Node 1 108.1 in a message. In block B262, Node 1 108.1 receives the message via cluster network 110. The packet is de-capsulated in block B264 and Node 1 determines the VNIC that holds the destination address. Thereafter, the packet is provided as input to the VNIC in block B266.

The various aspects described above enable a node of a Vserver to communicate on behalf of other nodes. The ADS 127 is stored and maintained at all nodes and this enables the Vservers to use all the IP addresses within the cluster.

Figure 3:
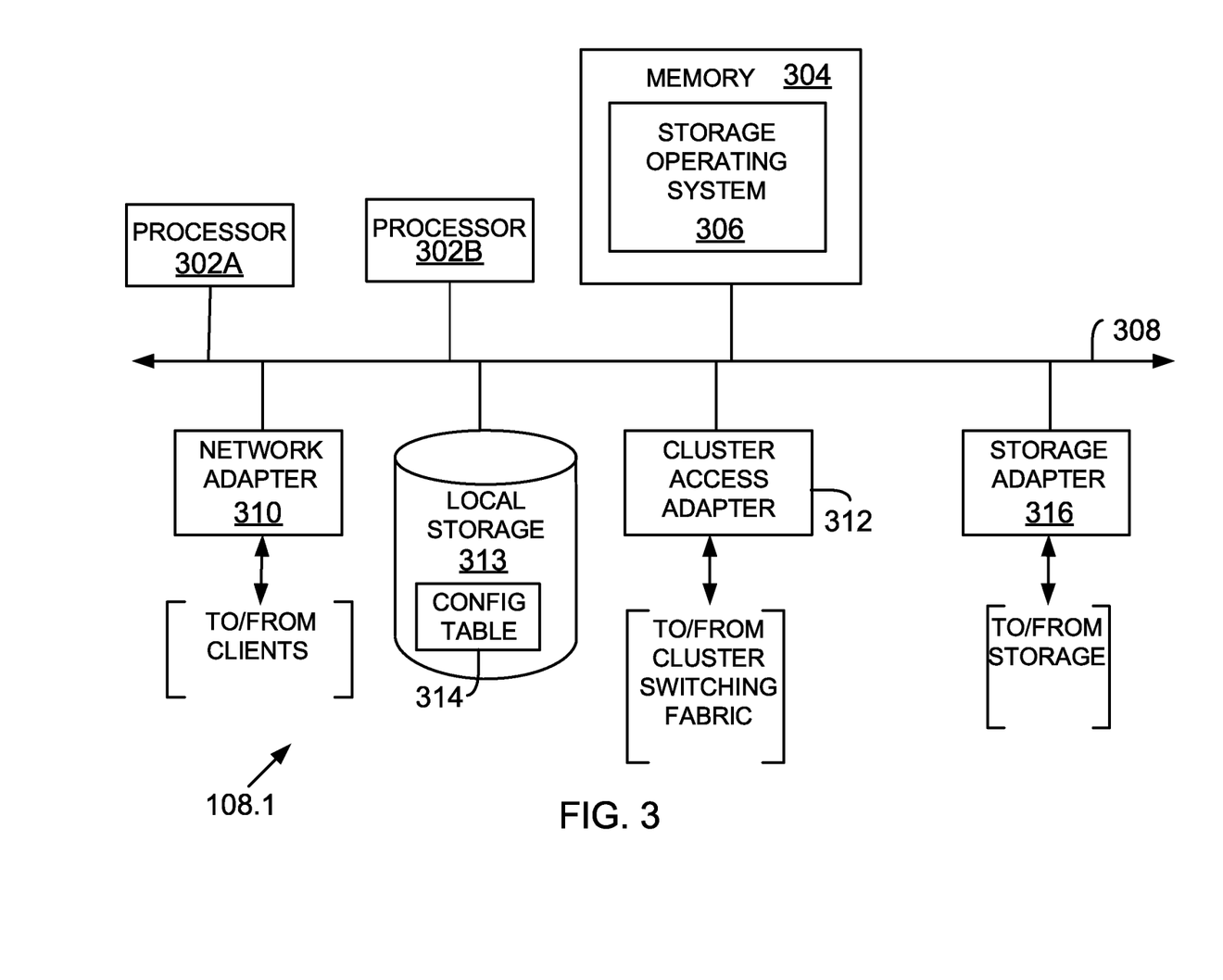
FIG. 3 is an example of a storage node used in the cluster of FIG. 2A, according to one aspect of the present disclosure.

Storage System Node: FIG. 3 is a block diagram of node 108.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Processors 302A-302B may be used to maintain ADS 127 that has been described above in detail.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314.

The cluster access adapter 312 (similar to 129, FIG. 1B) comprises a plurality of ports adapted to couple node 108.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100/101.

Node 108.1 is illustratively embodied as a dual processor storage system executing a storage operating system 306 that preferably implements a high-level module, such as a file system, to logically organize the information as a hierarchical structure of named directories and files on storage 112. However, it will be apparent to those of ordinary skill in the art that the node 108.1 may alternatively comprise a single or more than two processor systems. Illustratively, one processor 302A executes the functions of the M-module 118, N-module 114 on the node, while the other processor 302B executes the functions of the D-module 116. In another aspect, a dedicated processor may execute the functions of M-module 118.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the presented disclosure.

The storage operating system 306 portions of which is typically resident in memory and executed by the processing elements, functionally organizes the node 108.1 by, inter alia, invoking storage operation in support of the storage service implemented by the node.

The network adapter (or NIC) 310 (similar to NICs 124.1, 124.2A, 124.2B, 124.3 and 124.4) comprises a plurality of ports adapted to couple the node 108.1 to one or more clients over point-to-point links, wide area networks, virtual private networks implemented over a public network (Internet) or a shared local area network. The network adapter 310 thus may comprise the mechanical, electrical and signaling circuitry needed to connect the node to the network.

The storage adapter 316 cooperates with the storage operating system 306 executing on the node 108.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 112. The storage adapter 316 comprises a plurality of ports having input/output (I/O) interface circuitry that couples to the storage devices over an I/O interconnect arrangement, such as a conventional high-performance, FC link topology.

Figure 4:
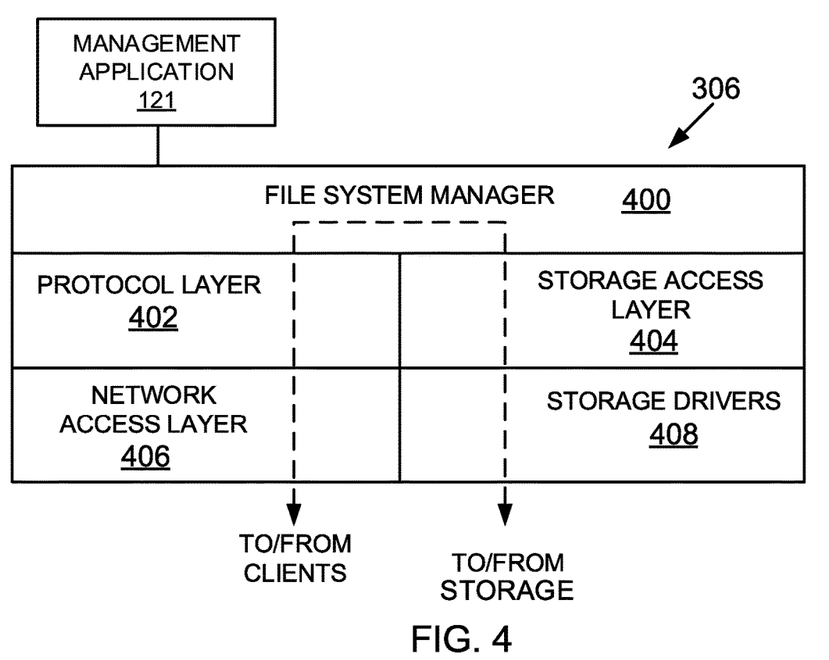
FIG. 4 shows an example of a storage operating system, used according to one aspect of the present disclosure.

Operating System: FIG. 4 illustrates a generic example of storage operating system 306 executed by node 108.1 that interfaces with management application 121, according to one aspect of the present disclosure. In one example, storage operating system 306 may include several modules, or "layers" executed by one or both of N-Module 114 and D-Module 116. These layers include a file system manager 400 that keeps track of a directory structure (hierarchy) of the data stored in storage devices and manages read/write operation, i.e. executes read/write operation on storage in response to client requests.

Storage operating system 306 may also include a protocol layer 402 and an associated network access layer 406, to allow node 108.1 to communicate over a network with other systems. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' and mass storage devices 112 are illustrated schematically as a path, which illustrates the flow of data through storage operating system 306.

The storage operating system 306 may also include a storage access layer 404 and an associated storage driver layer 408 to allow D-module 116 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information LUN, storage volume, aggregate and various storage devices.

As used herein, the term "storage operating system" generally refers to the computer-executable code operable on a computer to perform a storage function that manages data access and may, in the case of a node 108.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
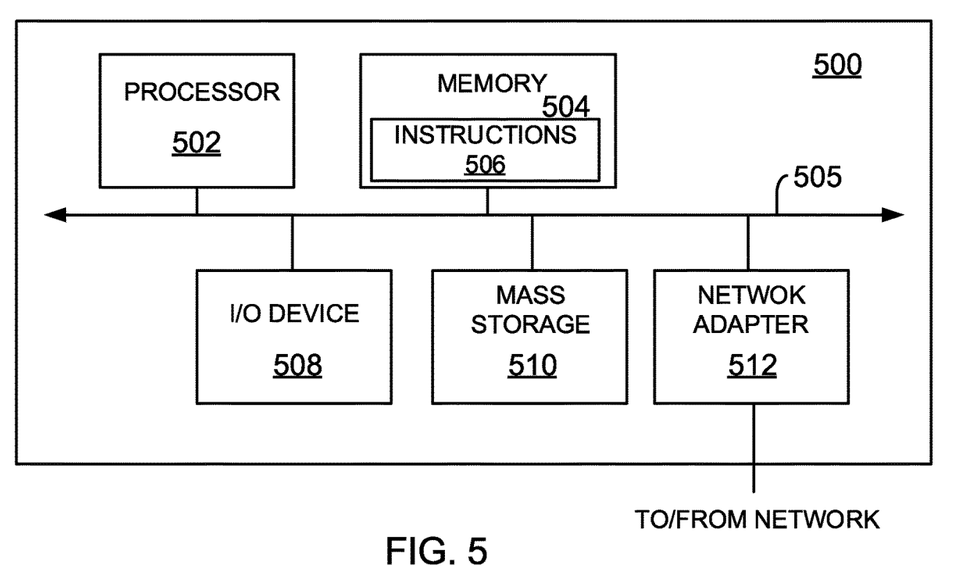
FIG. 5 shows an example of a processing system, used according to one aspect of the present disclosure.

Processing System: FIG. 5 is a high-level block diagram showing an example of the architecture of a processing system 500 that may be used according to one aspect. The processing system 500 can represent the management console 122 or client 104. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above with respect to FIGS. 2A-2F may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" as used herein refers to a network (for example, the Internet) that enables providing computing as a service.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage provider 116 (and associated methods thereof) and storage systems described above can be a part of the server layer for providing storage services. Details regarding these layers are not germane to the inventive aspects.

Thus, a method and apparatus for managing network access addresses have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   identifying, from a data structure by a virtual network interface card (VNIC), a second node of a networked storage system as owner of a network access address, the network access address assigned to a port of a physical network interface card (NIC) located at the second node, the VNIC hosted by a first virtual storage server (VServer) of a first node of the networked storage system, wherein the first node and the second node communicate via a first network connection to operate as separate physical nodes in the networked storage system;
   transmitting a port reservation request from the first node to the second node, via the first network connection, to reserve the port for enabling network communication on behalf of the second node by the first VServer;
   assigning, by the first node, the network access address to the VNIC, upon successful port reservation at the second node;
   updating, by the first node, the data structure with a port identifier to identify the port, the first VServer, and the first node indicating that the first node has reserved the port;
   initiating, by the first node, a second network connection with a computing device using the NIC and the network access address as a source address;
   using, by the first node, the updated data structure to identify the second node as owner of the network access address for a packet received by the VNIC at the first node;
   transferring the packet by the first node to the second node via the first network connection; and
   on behalf of the second node, transmitting the packet to the computing device by the port using the second network connection.

2. The method of claim 1, further comprising:
   determining, by the second node, based on the port reservation that a connection for a packet received by the NIC from the computing device was initiated by the first VServer; wherein the second node uses the updated data structure to identify the first node as a destination for the received packet, and forwards the received packet to the first node.

3. The method of claim 1, further comprising: utilizing, by the VNIC, the assigned network access address to communicate on behalf of a second VServer of the second node.

4. The method of claim 1, further comprising: storing, by the first node and the second node, the updated data structure to identify a protocol type for the network communication.

5. The method of claim 1, wherein the network access address is an Internet Protocol address.

6. The method of claim 2, further comprising: determining, by the first node, that the VNIC is a destination for the received packet and providing the received packet to the VNIC.

7. The method of claim 1, further comprising: storing, by the first node, a route in the updated data structure for routing packets for the first VServer from the second node.

8. A non-transitory machine readable storage medium having stored thereon instructions for performing a method, comprising machine executable code which when executed by at least one machine, causes the machine to:
   identify, from a data structure by a virtual network interface card (VNIC), a second node of a networked storage system as owner of a network access address, the network access address assigned to a port of a physical network interface card (NIC) located at the second node, the VNIC hosted by a first virtual storage server (VServer) of a first node of the networked storage system, wherein the first node and the second node communicate via a first network connection to operate as separate physical nodes in the networked storage system;
   transmit a port reservation request from the first node to the second node, via the first network connection, to reserve the port for enabling network communication on behalf of the second node by the first VServer;
   assign, by the first node, the network access address to the VNIC, upon successful port reservation at the second node;
   update, by the first node, the data structure with a port identifier to identify the port, the first VServer, and the first node indicating that the first node has reserved the port;
   store the updated data structure at the first node and the second node;
   initiate, by the first node, a second network connection with a computing device using the NIC and the network access address as a source address;
   use, by the first node, the updated data structure to identify the second node as owner of the network access address for a packet received by the VNIC at the first node;
   transfer the packet by the first node to the second node via the first network connection; and
   on behalf of the second node, transmit the packet to the computing device by the port using the second network connection.

9. The storage medium of claim 8, wherein the machine executable code further causes the machine to:

determine, by the second node, based on the port reservation that a connection for a packet received by the NIC from the computing device was initiated by the first VServer; wherein the second node uses the updated data structure to identify the first node as a destination for the received packet and forwards the received packet to the first node.

10. The storage medium of claim 8, wherein the VNIC uses the assigned network access address to communicate on behalf of a second Vserver of the second node.

11. The storage medium of claim 8, wherein the first node, and the second node store the updated data structure that identifies a protocol type for the network communication.

12. The storage medium of claim 8, wherein the network access address is an Internet Protocol address.

13. The storage medium of claim 9, wherein the first node determines that the VNIC is a destination for the received packet and the received packet is provided to the first VNIC.

14. The storage medium of claim 8, wherein the first node sends the packet encapsulated in a message to the second node that uses the updated data structure to identify the NIC to transmit the packet.

15. A system comprising:
a first virtual storage server (VServer) hosting a virtual network interface card (VNIC) at a first node of a network storage system, wherein the first node communicates with a second node of the networked storage system via a first network connection, and wherein the first node and the second node operate as separate physical nodes in the networked storage system;
wherein the VNIC using a data structure to identify the second node as owner of a network access address, the network access address assigned to a port of a physical network interface card (NIC) located at the second node;
wherein a port reservation request is transmitted from the first node to the second node, via the first network connection, to reserve the port for enabling network communication on behalf of the second node by the first VServer;
wherein first node assigns the network access address to the VNIC, upon successful port reservation at the second node;
wherein the first node updates the data structure with a port identifier to identify the port, the first VServer, and the first node indicating that the first node has reserved the port, the updated data structure stored at the first node and the second node;
wherein the first node initiates a second network connection with the computing device using the NIC and the network access address as a source address;
wherein the first node uses the updated data structure to identify the second node as owner of the network access address for a packet received by the VNIC at the first node;
wherein the first node transfers the packet to the second node via the first network connection; and
on behalf of the second node, the port transmits the packet to the computing device, using the second network connection.

16. The system of claim 15, wherein
based on the port reservation, the second node determines that a connection for a packet received by the NIC was initiated by the first VServer; wherein the second node uses the updated data structure to identify the first node as a destination for the received packet and forwards the received packet to the first node.

17. The system of claim 15, wherein the VNIC uses the assigned network access address to communicate on behalf of a second Vserver of the second node.

18. The system of claim 15, wherein the first node, and the second node store the updated data structure that identifies a protocol type for the network communication.

19. The system of claim 15, wherein the network access address is an Internet Protocol address.

20. The system of claim 15, wherein the first node sends the packet encapsulated in a message to the second node that uses the updated data structure to identify the NIC to transmit the packet.

* * * * *